United States Patent Office 2,895,981
Patented July 21, 1959

2,895,981
ARYL ESTERS OF ACID PHOSPHORUS COMPOUNDS

Howard M. Fitch, New York, N.Y., assignor to Campbell Pharmaceuticals, Inc., New York, N.Y., a corporation of Delaware No Drawing. Original application July 3, 1952, Serial No. 297,169, now Patent No. 2,759,961, dated August 21, 1956. Divided and this application September 8, 1955, Serial No. 533,243

11 Claims. (Cl. 260—461)

This invention relates to a new group of compounds which are effective inhibitors of cholinesterase activity and to methods for the production of such compounds.

The compounds of the invention comprise diaryl esters of acid phosphorus compounds wherein the aryl rings are substituted by a group including an aliphatically disubstituted amino group, such as dialkylamino, piperidino, pyrrolidino and morpholino groups, and the acid addition salts and quaternary salts of such esters.

The compounds of the invention are derivatives of phosphoric, phosphonic, phosphinic and phosphorus acids, and their thio analogs and corresponding polyphosphoric acids, wherein two of the hydroxyls of the acid are substituted by a dialkylaminoaryloxy or a dialkylaminoalkylaryloxy group. One part of the hydroxyls may also be substituted by halogen, amino, substituted amino, alkyl, aryl, alkoxy or aryloxy groups. The compounds may be prepared or used in the form of their salts with inorganic and organic acids or their quaternary salts, for example, with alkyl halides and sulfates.

In general, the compounds of the invention inhibit cholinesterase and are useful as vasodilators and as stimulants of smooth or striated muscle. The vasodilator action is particularly evident in the compounds of the invention having sulfur attached to phosphorus in the molecule.

The phosprorus esters of the invention may be prepared by reacting a dialkylamino substituted phenol with a phosphorus halide (including oxyhalides and thiohalides). A phenolic hydrogen from the phenol combines with a halogen from the phosphorus halide, so that an ester linkage is formed and hydrogen halide is evolved. The hydrogen halide reacts with the dialkylamino group of the starting material or products to form a hydrogen halide salt. Better yields and a more complete utilization of the dialkylamino substituted phenol or naphthol are obtained by using an acid-acceptor to react with the hydrogen halide. Tertiary amines are suitable acid-acceptors; and alkyl tertiary amines, such as triethylamine, and heterocyclic tertiary amines, such as pyridine, are preferred.

The phosphorus esters may also be prepared by reacting the sodium or other alkali metal salt of a dialkylamino substituted phenol with a phosphorus halide. In this case sodium halide, rather than hydrogen halide, is formed, and the alkali metal acts as acid-acceptor.

In either case the reactants are conveniently dissolved or suspended in a relatively inert solvent, preferably benzene or toluene, or an excess of the acid-acceptor may be used as the solvent. In some reactions, an alcohol or even water may be used as the solvent, depending on the activity of the phosphorus halide.

It is usually preferable to start with a phosphorus trihalide, replacing two of the halogen atoms with a dialkylamino substituted phenolic ester linkage. The remaining halogen atom may be reacted further, for example, with ammonia or a primary or secondary amine, to obtain esters with amino or other groups attached to the phosphorus atom.

It is sometimes desirable, however, depending on the availability of the intermediates and the ease of the reaction to start with a substituted phosphorus dihalide in which a group, such as an alkyl, aryl, alkoxy, aryloxy, amino or substituted amino group, is attached directly to phosphorus, and to replace the two halogen atoms with dialkylamino substituted phenolic ester linkages.

In general, the dialkylamino substituted aryl phosphorus esters of the invention are colorless or pale yellow oils or solids, readily soluble in benzene, acetone, or ether and relatively insoluble in water or petroleum ether. The presence of a water-solubilizing group, however, such as a hydroxyl group attached to phosphorus, may alter or reverse the solubility pattern.

The esters show the typical behavior of tertiary amines, forming water-soluble salts with mineral acids, such as hydrochloric, hydrobromic or sulfuric acid, and with organic acids, such as oxalic acid, and forming water-soluble quarternary salts with methyl iodide, methyl bromide or dimethyl sulfate. The salts with mineral and organic acids are usually oils or non-crystalline solids, as are the methobromides and methomethyl sulfates. The methiodides can be obtained crystalline in many cases. They are usually hygroscopic and tend to crystallize with one or more molecules of water of crystallization. One molecule of water is usually very firmly attached; any additional water can usually be removed by drying at reduced pressure over phosphorus pentoxide. The methiodides decompose when heated to their melting point, and the apparent melting points depend on the rate of heating. For all melting points reported, the rate of heating was 5° C. per minute or slower.

The following specific examples and corresponding structural formulas are illustrative of the compounds and methods of the invention:

EXAMPLE I

Di-(p-dimethylaminophenyl)thiophosphoryl chloride

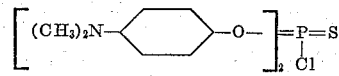

A solution of 8.73 g. p-dimethylaminophenol (0.064 mole) and 6.58 g. triethylamine (0.065 mole) in 100 cc. benzene is added with stirring during 1 hour to a solution of 5.34 g. phosphorus thiochloride (0.032 mole) in 150 cc. benzene at 22–30° C. The reaction mixture is heated to 70° C. during 1 hour, stirred at 70–75° C. for 3 hours and filtered hot from 7.36 g. triethylamine hydrochloride. The filtrate is concentrated to about 25 cc. on a steam bath, diluted with 50 cc. isopropanol and filtered, yielding 8.25 g. (71% theory) of crude di-(p-dimethylaminophenyl) thiophosphoryl chloride. When purified by crystallization from a mixture of benzene and isopropanol and from isopropanol, long white needles melting at 165.5–6.5° C. are obtained.

The dimethiodide crystallizes with one molecule of water as cream-colored plates melting at 165–7° C. with gas evolution.

EXAMPLE II

Di-(m-dimethylaminophenyl) thiophosphoryl chloride

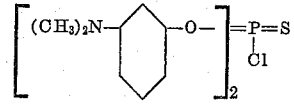

This compound is prepared from m-dimethylaminophenol by the method of Example I and purified by distillation in a molecular still at about 175° C. and 1

EXAMPLE III

Di-(m-dimethylaminophenyl)phosphoryl fluoride

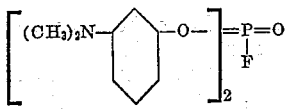

A solution of 13.71 g. m-dimethylaminophenol (0.10 mole) and 10.11 g. triethylamine (0.10 mole) in 200 cc. benzene is added with stirring during 2 hours to a solution of 7.68 g. phosphorus oxychloride (0.05 mole) in 100 cc. benzene at 21–32° C. After stirring at this temperature for 2 hours longer, the mixture is heated to 65° C. during 1 hour and held at 65–70° C. for 1 hour, then left overnight at room temperature and filtered from 13.18 g. triethylamine hydrochloride. Without isolating the di-(m-dimethylaminophenyl) phosphoryl chloride, thus obtained, from the filtrate, 3.70 g. dry ammonium fluoride (0.10 mole) is added and the mixture is stirred at 65–70° C. for 14 hours, left at room temperature overnight, and filtered from 8.59 g. insoluble solid. Removal of benzene from the filtrate by distillation under reduced pressure leaves an oil, which is stirred with 600 cc. ether and decanted from some insoluble tar. Removal of ether on the steam bath leaves 14.08 g. crude di(m-dimethylaminophenyl) phosphoryl fluoride as a light-red oil that does not give a Beilstein test for chlorine. When purified by distillation in a molecular still at about 150–200° C. at 5–8 microns pressure, 8.18 g. (48% theory) of pale yellow liquid is obtained, $n_D^{25}$ 1.5651. The monomethiodide is an amorphous, deliquescent, pale yellow solid that softens at about 70° C. and melts with gas evolution at 95–105° C.

EXAMPLE IV

Di-(p-dimethylaminophenyl)thiophosphoryl fluoride

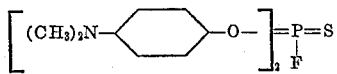

2.31 grams di-(p-dimethylaminophenyl)thiophosphoryl chloride (0.006 mole) and 0.37 g. ammonium fluoride (0.010 mole) in 150 cc. isopropanol is stirred at 75–80° C. for 5 hours, and the resulting solution is decanted hot from a little insoluble solid. The isopropanol solution is concentrated to about 20 cc., decanted from a little more insoluble solid, diluted with 100 cc. water, iced and filtered from 1.62 g. of crude di-(p-dimethylaminophenyl) thiophosphoryl fluoride (78% theory). Crystallization from 90% alcohol and from isopropanol yields flat white needles melting at 110.5–12° C.

The fluoride may also be prepared by heating di-(p-dimethylaminophenyl) thiophosphoryl chloride with sodium fluoride in isopropanol.

The dimethiodide crystallizes with two molecules of water as small white plates melting at 159–62° C. with gas evolution.

EXAMPLE V

Di-(p-dimethylaminophenyl)isopropyl thiophosphate

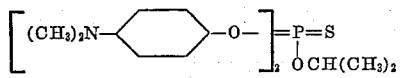

1.86 grams di-(p-dimethylaminophenyl) thiophosphoryl chloride (0.005 mole) is added to a solution of 0.114 g. sodium (0.005 mole) in 20 cc. isopropanol. The mixture is heated to boiling, then left at room temperature with occasional stirring for 4 days and filtered from sodium chloride and unchanged thiophosphoryl chloride. Removal of solvent from the filtrate under reduced pressure leaves 1.24 g. crude di-(p-dimethylaminophenyl) isopropyl thiophosphate (63% theory). When purified by crystallization from methanol and from isopropanol, colorless needles melting at 74–6° C. are obtained. The dimethiodide crystallizes with three molecules of water as white needles melting at 177–7.5° C. with gas evolution.

EXAMPLE VI

Di-(p-dimethylaminophenyl) ester of aminothiophosphonic acid

To a suspension of 1.48 g. di-(p-dimethylaminophenyl) thiophosphoryl chloride (0.004 mole) in 10 cc. acetone is added 1.0 cc. concentrated ammonium hydroxide (0.015 mole). After an hour of occasional stirring at room temperature, the thiophosphoryl chloride dissolves. The solution is left at room temperature overnight, then diluted with 100 cc. water and filtered. The precipitate is 1.36 g. crude di-(p-dimethylaminophenyl) ester of aminothiophosphonic acid (97% theory). When purified by crystallization from a mixture of methyl acetate and 95% alcohol and from isopropanol, long white needles melting at 162–3° C. are obtained.

The dimethiodide crystallizes with four molecules of water as white crystals that soften at about 170° C. and melt at 180–181° C. with gas evolution.

EXAMPLE VII

Di-(p-dimethylaminophenyl) ester of methylaminothiophosphonic acid

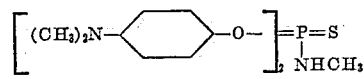

This compound is prepared by the method of Example VI, using excess 25% methylamine solution instead of ammonium hydroxide, and is purified by crystallization from 95% alcohol and from isopropanol. Short white needles melting at 112.5–4° C. are obtained.

The dimethiodide crystallizes with three molecules of water as long white needles melting at 148–51° C. with gas evolution.

EXAMPLE VIII

Di-(p-dimethylaminophenyl) ester of dimethylaminothiophosphonic acid

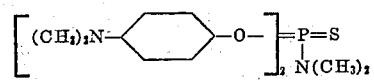

This compound is prepared by the method of example VI, using excess dimethylamine instead of ammonium hydroxide and using benzene as the solvent. When purified by crystallization from methanol, it is obtained as white needles melting at 103–5.5° C.

The dimethiodide crystallizes with two molecules of water as light tan crystals melting at 181–4° C. with gas evolution.

EXAMPLE IX

Di-(m-dimethylaminophenyl) ester of dimethylaminophosphonic acid

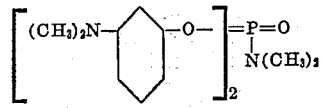

Excess dimethylamine is added to a benzene solution of di-(m-dimethylaminophenyl) phosphoryl chloride, prepared as described in Example III. The mixture is stirred at 30–40° C. for 6 hours, left overnight at room temperature and filtered from dimethylamine hydrochloride. The filtrate is washed with N NaOH solution and with saturated brine and dried over calcium sulfate. Removal of solvent by distillation under reduced pressure leaves the crude di-(m-dimethylaminophenyl) ester of dimethylaminophosphonic acid as a brown oil (87% theory). Distillation in a molecular still at about 200–225° C. at 1–2 microns pressure gives a colorless oil, $n_D^{25}$ 1.5760.

The compound may also be prepared by reacting dimethylaminophosphonyl chloride with sodium m-dimethylaminophenate and by reacting dimethylaminophosphonyl chloride with m-dimethylaminophenol in the presence of triethylamine.

The dimethiodide crystallizes with one molecule of water as white crystals melting at 171–2° C. with decomposition.

EXAMPLE X

*Di-(p-dimethylaminophenyl) thiophosphoryl bromide*

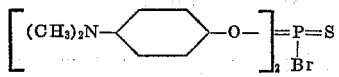

This compound is prepared from p-dimethylaminophenol and phosphorus thiobromide by the method of Example I and purified by crystallization from carbon tetrachloride and from a mixture of toluene and petroleum ether. It is obtained as white crystals melting at 158–64° C.

The dimethiodide crystallizes with two molecules of water as a pale yellow solid melting with gas evolution at 137–41° C.

EXAMPLE XI

*Di-(m-dimethylaminophenyl) sodium phosphate*

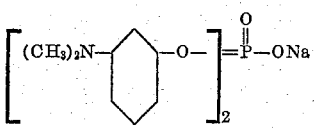

A benzene solution of di-(m-dimethylaminophenyl) phophoryl chloride is prepared as described in Example III, and the benzene is removed by distillation under reduced pressure. The residue is dissolved in isopropanol, treated with an equimolar quantity of 10 N NaOH solution, and the product is thrown down by adding excess ether. Crystallization from isopropanol yields long white needles that partially melt and turn red at about 228° C. and decompose at about 260° C.

EXAMPLE XII

*Di-(m-diethylaminophenyl) ester of dimethylamino phosphonic acid*

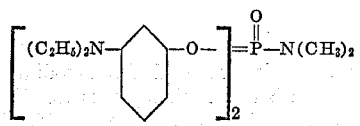

This compound, prepared from di-(m-diethylaminophenyl) phosphoryl chloride by the method of Example IX and purified by distillation in a molecular still at about 225° C. and 1 micron pressure, is obtained as a colorless oil, $n_D^{25}$ 1.5595.

The dimethiodide is obtained as white crystals melting at 177–8° C. with gas evolution.

EXAMPLE XIII

*Di-(p-dimethylaminophenyl) ester of dibutylamino thiophosphonic acid*

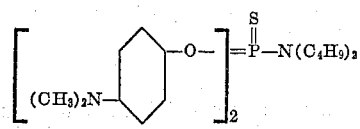

A mixture of 2.97 g. di-(p-dimethylaminophenyl) thiophosphoryl chloride (0.008 mole) and 4.13 g. di-n-butylamine (0.032 mole) is boiled under reflux for 1 hour, cooled, diluted with 100 cc. ether and filtered from 1.28 g. di-n-butylamine hydrochloride. Ether is distilled from the filtrate, and the residue is distilled in a molecular still at about 225° C. and 1 micron pressure, yielding 2.33 g. (60% theory) of pale yellow oil, $n_D^{25}$ 1.5716.

The dimethiodide is obtained as white needles melting at 181–3° C. with gas evolution.

EXAMPLE XIV

*Di-(p-dimethylaminophenyl) ester of phenylamino thiophosphonic acid*

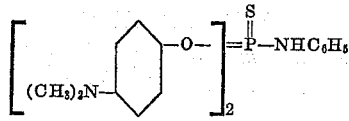

This compound, prepared by the method of Example XIII using aniline in place of dibutylamine and purified by crystallization from a mixture of benzene and isopropanol, is obtained as long white needles melting at 177–80° C.

The dimethiodide is obtained as small white needles melting at 177–8° C. with gas evolution.

EXAMPLE XV

*Di-(m-dimethylaminophenyl) ester of benzene phosphonic acid*

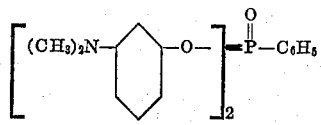

5.85 grams of benzene phosphorus oxydichloride (0.03 mole) in 50 cc. benzene is added with stirring to a solution of 8.22 g. m-dimethylaminophenol (0.06 mole) and 6.08 g. triethylamine (0.06 mole) in 150 cc. benzene during ½ hour. The temperature increases from 26 to 36° C. and a precipitate forms during the addition. The mixture is heated to 65° C. during ¼ hour, stirred at 65 to 70° C. for 6 hours, cooled and filtered from 7.96 g. triethylamine hydrochloride. Benzene is removed from the filtrate by distillation under reduced pressure. The residue is taken up in 300 cc. ether, stirred with 0.5 g. Darco, dried over calcium sulfate, filtered, and ether is removed by distillation on a steam bath. The residue is 11.49 g. (97% theory) of a yellow oil that solidifies on cooling. Purification by crystallization from 80% alcohol gives short colorless rods melting at 90–91° C.

The dimethiodide crystallizes from a mixture of methanol and isopropanol as a white solid melting at 192–4° C. with gas evolution.

EXAMPLE XVI

*Di-(o-dimethylaminophenyl) ester of benzene phosphonic acid*

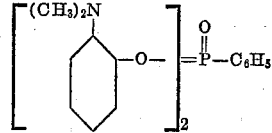

This compound is prepared from o-dimethylaminophenol and benzene phosphorus oxydichloride by the method of Example XV. When purified by distillation in a molecular still at about 200° C. and 2 to 4 microns pressure, it is obtained as a colorless oil, $n_D^{25}$ 1.5864.

The monomethiodide is obtained from a mixture of isopropanol and ether as an amorphous, hygroscopic solid that contains about 5 molecules of water and melts indefinitely at 78–95° C. with gas evolution.

EXAMPLE XVII

*Di-(p-dimethylaminophenyl) ester of benzene phosphonic acid*

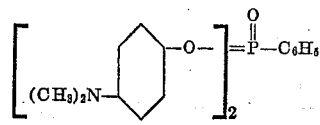

This compound is prepared from p-dimethylaminophenol and benzene phosphorus oxydichloride by the method of Example XV. When crystallized from 95% alcohol and from methylethyl ketone, it is obtained as white needles that melt at 173–5° C.

The dimethiodide crystallizes with one molecule of water as white needles melting at 162–4° C. with gas evolution.

EXAMPLE XVIII

*Di-(m-diethylaminophenyl) ester of benzene phosphonic acid*

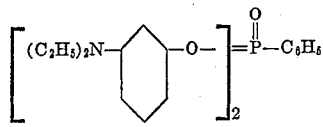

This compound is prepared from m-diethylaminophenol and benzene phosphorus oxydichloride by the method of Example XV. When purified by distillation in a molecular still at about 250° C. and 1 micron pressure, it is obtained as a colorless oil, $n_D^{25}$ 1.5887. The oil slowly solidifies, and crystallization from dilute alcohol gives white needles melting at 37–8° C.

The monomethiodide is obtained as fluffy white needles melting at 147–8° C. with gas evolution.

The dimethiodide is obtained as a pale pink solid melting indefinitely at 98–111° C. with gas evolution and containing one molecule of water.

EXAMPLE XIX

*Di-(m-dimethylaminophenyl) ester of heptane phosphonic acid*

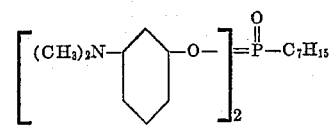

This compound is prepared from m-dimethylaminophenol and heptane phosphorus oxydichloride (J. Am. Chem. Soc. 70, 3880 (1948)), by the method of Example XV. When purified by distillation in a molecular still at about 225° C. and 1 micron pressure, it is obtained as a pale yellow oil, $n_D^{25}$ 1.5550.

The dimethiodide is a pale yellow, amorphous deliquescent solid that melts indefinitely at 90–115° C. with gas evolution.

EXAMPLE XX

*Di-(m-dimethylaminophenyl) ester of cyclohexane phosphonic acid*

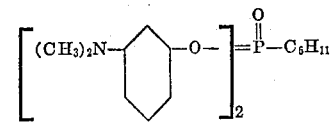

This compound is prepared from m-dimethylaminophenol and cyclohexane phosphorus oxydichloride (J. Am. Chem. Soc. 70, 3880 (1948)), by the method of Example XV. When purified by distillation in a molecular still at 250–275° C. and 1 micron pressure, it is obtained as a pale amber oil, $n_D^{25}$ 1.5782.

The dimethiodide is obtained as white crystals melting at 202–4° C. with gas evolution.

EXAMPLE XXI

*Di-(o-dimethylaminomethylphenyl) ester of benzene phosphonic acid*

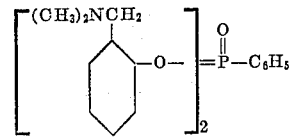

This compound is prepared from o-dimethylaminomethylphenol and benzene phosphorus oxydichloride by the method of Example XV. When purified by distillation in a molecular still at about 225° C. and 6–8 microns pressure, it is obtained as a colorless oil, $n_D^{25}$ 1.5609.

The dihydrobromide is obtained as white crystals melting at 232.5–3.5° C.

The dimethiodide is obtained as a light cream-colored solid that softens at 127° C., melts indefinitely at about 175° C. with gas evolution, and contains five molecules of water.

EXAMPLE XXII

*Di-(m-diethylaminophenyl) ester of benzenethiophosphonic acid*

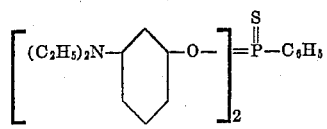

To a solution of sodium m-diethylaminophenate (prepared by adding 16.52 g. m-diethylaminophenol (0.10 mole) in 150 cc. benzene to a solution of 2.29 g. sodium in 30 cc. isopropanol plus 30 cc. benzene under nitrogen) is added 10.56 g. benzene phosphorus thiodichloride (0.05 mole) during ¼ hour with stirring and cooling to maintain the temperature at 20–30° C. After standing at room temperature for 4 days, solvent is removed by distillation under reduced pressure. The residue is taken up in 350 cc. ether, stirred with 0.5 g. Darco, dried over calcium sulfate, filtered, and ether removed by distillation on a steam bath. The residue is 19.59 g. (83% theory) of pale red oil. Purification by distillation in molecular still at about 275° C. and 1 micron pressure gives a pale yellow oil, $n_D^{25}$ 1.6099.

The monomethiodide melts at 198–201° C. with gas evolution.

The dimethiodide melts at 144–5° C. with gas evolution.

EXAMPLE XXIII

*Di-(o-dimethylaminomethylphenyl) ester of benzenethiophosphonic acid*

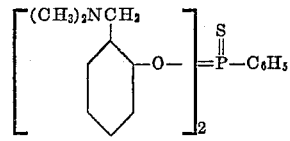

This compound is prepared from o-dimethylaminomethylphenol and benzene phosphorus thiodichloride by the method of Example XXII. When purified by distillation in a molecular still at 200–255° C. and 6–10 microns pressure, it is obtained as a pale yellow oil, $n_D^{25}$ 1.5858.

The dimethiodide is obtained as white crystals melting with decomposition at 214–6° C.

EXAMPLE XXIV

*Di-(m-dimethylaminophenyl) ester of benzenethiophosphonic acid*

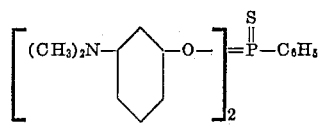

This compound is prepared from sodium m-dimethylaminophenate and benzenephosphorusthiodichloride as described in Example XXII. It crystallizes from a mixture of acetone and 95% alcohol as white needles melting at 93–4° C. The dihydrochloride crystallizes with two molecules of water as white needles melting with gas evolution at 189–190.5° C. It is soluble in a little water but does not remain completely in solution when diluted unless excess acid is present. The dimethiodide melts at 182–4° C.

EXAMPLE XXV

*Di-(m-dimethylaminophenyl) ester of benzenephosphonous acid*

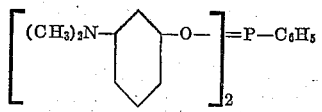

This compound is prepared from m-dimethylaminophenol and benzenephosphorusdichloride as described in Example XV. When purified by distillation in a molecular still at about 150° C. and 2 to 3 microns pressure, it is obtained as a colorless oil, $n_D^{25}$ 1.6280. It reacts with three molecules of methyl iodide to give a trimethiodide in which one molecule of methyl iodide is attached to phosphorus as a phosphonium compound that crystallizes with four molecules of water and melts with gas evolution at 182–5° C.

EXAMPLES XXVI AND XXVII

The following compounds are prepared from di-(m-dimethylaminophenyl)phosphoryl chloride and anhydrous ammonia or the corresponding amine as described in Example IX.

EXAMPLE XXVI

*Di-(m-dimethylaminophenyl) ester of aminophosphonic acid*

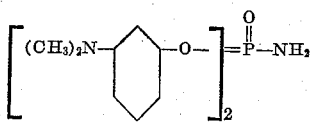

This compound crystallizes from 50% alcohol as long white needles melting at 141.5–2.5° C. The dimethiodide crystallizes from 95% alcohol as long white needles melting with gas evolution at 182–3.5° C.

EXAMPLE XXVII

*Di-(m-dimethylaminophenyl) ester of 3-dimethylaminopropyl-aminophosphonic acid*

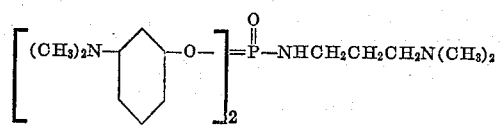

This compound distills in a molecular still at about 175° C. at 1 micron pressure as a very pale yellow oil $n_D^{25}$ 1.5678. The trimethiodide crystallizes with 3 molecules of water as light tan crystals that melt with gas evolution at 176–81° C.

EXAMPLE XXVIII

*Di-(o-dimethylaminophenyl) isopropyl thiophosphate*

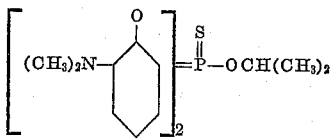

To a solution of sodium o-dimethylaminophenate prepared by adding 139.9 g. o-dimethylaminophenol (1.02 moles) to a solution of 23.46 g. sodium (1.02 moles) in 229 cc. isopropanol (3 moles) and 1 liter of dry benzene under an atmosphere of dry nitrogen is added 57.6 g. of phosphorus thiochloride in 50 cc. dry benzene with stirring at 2–4° C. during 2½ hours. The mixture is left in a refrigerator at 2–4° C. overnight and then at room temperature for 6 days. The reaction mixture is washed successively with water and with saturated sodium chloride solution, and is then stirred with 3 g. Darco and 25 g. anhydrous calcium sulfate and filtered.

Distillation of solvent from the filtrate under reduced pressure leaves di-(o-dimethylaminophenyl) isopropyl thiophosphate, a colorless liquid, $n_D^{25}$ 1.5622, that distills at about 100° C. at 1 micron pressure in a molecular still. The monomethiodide crystallizes from isopropanol as white feathery needles that melt with gas evolution at 117–8° C.

EXAMPLES XXIX–L

Di-(m-dimethylaminophenyl) esters of substituted amino thiophosphonic acids are prepared in the following manner. A solution of 13.71 g. m-dimethylaminophenol (0.10 mole) and 10.11 g. triethylamine (0.10 mole) in 100–200 cc. benzene is added to 8.47 g. phosphorus thiochloride (0.05 mole) in 50–100 cc. benzene with stirring at 3–5° C. during 4–6 hours. The mixture is left at room temperature for 3 days or longer or is heated at about 75° C. for 2–3 hours and cooled and is filtered from triethylamine hydrochloride. In some cases the filtrate is used directly and in other cases solvent is removed by distillation under reduced pressure. To the di-(m-dimethylaminophenyl) thiophosphoryl chloride thus obtained is added 0.10 mole of the appropriate amine, and the mixture is heated to complete the reaction. The excess amine serves as an acid acceptor for the hydrogen chloride formed in the reaction, and the amine hydrochloride is filtered from the reaction mixture (after adding ether or benzene if solvent is removed before the reaction). The filtrate is washed with water, then with 2 N sodium hydroxide solution and again with water and with saturated sodium chloride solution, and is dried over calcium sulfate (after stirring with a little Darco if colored impurities are present) and filtered. Solvent is removed by distillation, and the residue is purified by distillation in a molecular still or by crystallization or both. For each example the amount of heating of the reaction mixture and the presence or absence of solvent is noted in parentheses.

EXAMPLE XXIX

*Di-(m-dimethylaminophenyl) ester of dimethylaminothiophosphonic acid*

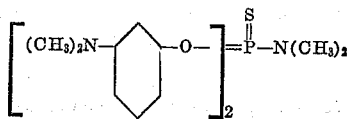

(Heated at 65–70° C. for 5 hours, in benzene.) The base is a pale yellow oil that distills at about 150° C. at 1 micron pressure, $n_D^{25}$ 1.5990. The dimethiodide crystallizes from absolute alcohol wtih 3 molecules of water as a pale yellow solid that melts with gas evolution at 146–50° C.

EXAMPLE XXX

*Di-(m-dimethylaminophenyl) ester of di-n-propyl-aminothiophosphonic acid*

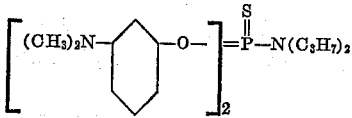

(Heated at 75–80° C. for 10 hours, in benzene.) The base is obtained from 95% alcohol as white crystals, M.P. 108–9.5° C. The dimethiodide crystallizes from a mixture of acetone and absolute alcohol with 3 molecules of water as a white solid that melts with gas evolution at 161–3° C.

EXAMPLE XXXI

*Di-(m-dimethylaminophenyl) ester of n-butylamino-thiophosphonic acid*

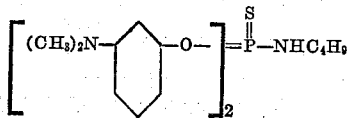

(Heated at 70–75° C. for 6 hours, in benzene.) The base is a pale yellow oil that distills at about 150° C. at 3–4 microns pressure, $n_D^{25}$ 1.5910. The dimethiodide crystallizes with 1 molecule of water from a mixture of acetone and isopropanol as fluffy white needles melting with gas evolution at 135–7° C.

EXAMPLE XXXII

*Di-(m-dimethylaminophenyl) ester of di-n-butylaminothiophosphonic acid*

$$\left[(CH_3)_2N-\underset{}{\underset{}{\bigcirc}}-O-\right]_2 =\overset{S}{\underset{\|}{P}}-N(C_4H_9)_2$$

(Heated at 100° C. for 2½ hours and at 150° C. for 1 hour, no solvent.) The base is a pale yellow oil that distills at about 160° C. at 3–4 microns pressure, $n_D^{25}$ 1.5689. The dimethiodide crystallizes from a mixture of acetone and absolute alcohol with 3 molecules of water as white crystals that melt with gas evolution at 170–2° C.

EXAMPLE XXXIII

*Di-(m-dimethylaminophenyl) ester of di-isobutylaminothiophosphonic acid*

$$\left[(CH_3)_2N-\underset{}{\underset{}{\bigcirc}}-O-\right]_2 =\overset{S}{\underset{\|}{P}}-N(iso\text{-}C_4H_9)_2$$

(Heated at 100° C. for 5 hours and at 135° C. for 21 hours, no solvent.) The base is a yellow oil that distills at about 150° C. at 1 micron pressure, $n_D^{25}$ 1.5696. The dimethiodide crystallizes from isopropanol with 2 molecules of water as white plates that melt with gas evolution at 124–6° C.

EXAMPLE XXXIV

*Di-(m-dimethylaminophenyl) ester of di-n-heptylaminothiophosphonic acid*

$$\left[(CH_3)_2N-\underset{}{\underset{}{\bigcirc}}-O-\right]_2 =\overset{S}{\underset{\|}{P}}-N(C_7H_{15})_2$$

(Heated at 100° C. for 7 hours and at 135° C. for 14 hours, no solvent.) The base is a yellow oil that distills at about 200° C. at 1 micron pressure, $n_D^{25}$ 1.5527. The dimethiodide crystallizes from a mixture of acetone and isopropanol as white needles that melt with gas evolution at 160–2° C.

EXAMPLE XXXV

*Di-(m-dimethylaminophenyl) ester of 3-dimethylaminopropylaminothiophosphonic acid*

$$\left[(CH_3)_2N-\underset{}{\underset{}{\bigcirc}}-O-\right]_2 =\overset{S}{\underset{\|}{P}}-NHCH_2CH_2CH_2N(CH_3)_2$$

(Heated at 65–70° C. for 5 hours, in benzene.) The base is a very pale yellow oil that distills at about 150° C. at 1 micron pressure, $n_D^{25}$ 1.5873. The mono-oxalate crystallizes from a mixture of absolute alcohol and isopropanol as white needles, M.P. 122–3° C. The dihydrochloride crystallizes from a mixture of isopropanol and ether as a hygroscopic white solid that softens about 70° C. and melts indefinitely at 78–98° C. The trimethiodide crystallizes from a mixture of absolute alcohol and isopropanol with 1 molecule of water as a pale yellow solid that melts with gas evolution at 125–30° C.

EXAMPLE XXXVI

*Di-(m-dimethylaminophenyl) ester of phenylaminothiophosphonic acid*

$$\left[(CH_3)_2N-\underset{}{\underset{}{\bigcirc}}-O-\right]_2 =\overset{S}{\underset{\|}{P}}-NHC_6H_5$$

(Heated at 100° C. for 2½ hours and at 150° C. for 1 hour, no solvent.) The base crystallizes from 95% alcohol as white needles, M.P. 97–8° C. The dimethiodide crystallizes from a mixture of methanol and acetone with 1 molecule of water as a white solid that melts with gas evolution at 130–1° C.

EXAMPLE XXXVII

*Di-(m-dimethylaminophenyl) ester of N-methylphenylaminothiophosphonic acid*

$$\left[(CH_3)_2N-\underset{}{\underset{}{\bigcirc}}-O-\right]_2 =\overset{S}{\underset{\|}{P}}-N\diagup^{CH_3}_{C_6H_5}$$

(Heated at 100° C. for 4 hours and at 150° C. for 1 hour, no solvent.) The base is a pale yellow oil that distills at about 175° C. at 2–3 microns pressure, $n_D^{25}$ 1.6230. The dimethiodide crystallizes from a mixture of methanol and acetone as white crystals that melt with gas evolution at 135–6° C.

EXAMPLE XXXVIII

*Di-(m-dimethylaminophenyl) ester of N-n-butylphenylaminothiophosphonic acid*

$$\left[(CH_3)_2N-\underset{}{\underset{}{\bigcirc}}-O-\right]_2 =\overset{S}{\underset{\|}{P}}-N\diagup^{C_4H_9}_{C_6H_5}$$

(Heated at 100° C. for 7 hours and at 135° C. for 21 hours, no solvent.) The base is a yellow oil that distills at about 175° C. at 1 micron pressure, $n_D^{25}$ 1.6048. The dimethiodide crystallizes from a mixture of absolute alcohol, acetone and petroleum ether as white needles that melt with gas evolution at 123–4.5° C.

EXAMPLE XXXIX

*Di-(m-dimethylaminophenyl) ester of p-diemthylaminophenylaminothiophosphonic acid*

$$\left[(CH_3)_2N-\underset{}{\underset{}{\bigcirc}}-O-\right]_2 =\overset{S}{\underset{\|}{P}}-NH-\underset{}{\underset{}{\bigcirc}}-N(CH_3)_2$$

(Heated at 120° C. for 7 hours, no solvent.) The base crystallizes from 95% alcohol as white needles, M.P. 124–6° C. The trimethiodide crystallizes from a mixture of absolute alcohol and isopropanol with 4 molecules of water as white crystals that melt with gas evolution 147–50° C.

EXAMPLE XL

*Di-(m-dimethylaminophenyl) ester of benzylaminothiophosphonic acid*

$$\left[(CH_3)_2N-\underset{}{\underset{}{\bigcirc}}-O-\right]_2 =\overset{S}{\underset{\|}{P}}-NHCH_2C_6H_5$$

(Heated at 100° C. for 1 hour, no solvent.) The base is an amber oil that distills at about 185° C. at 1 micron pressure, $n_D^{25}$ 1.6212. The dihydrochloride crystallizes from a mixture of absolute alcohol and isopropanol as a white solid melting with gas evolution at 179–81° C.

The dimethiodide crystallizes from a mixture of 95% alcohol and isopropanol with 2 molecules of water as white crystals that melt with gas evolution at 172–3.5° C.

EXAMPLE XLI

Di-(m-dimethylaminophenyl) ester of a α-methylbenzylaminothiophosphonic acid

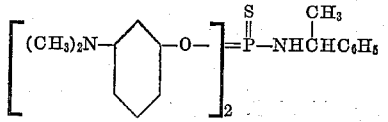

(Heated at 100° C. for 2 hours, no solvent.) The base is a very viscous yellow oil that distills at about 200° C. at 1 micron pressure, $n_D^{25}$ 1.6165. The dimethiodide crystallizes from a mixture of absolute alcohol and isopropanol with 3 molecules of water as a pale tan solid that melts with gas evolution at 117–20° C.

EXAMPLE XLII

Di-(m-dimethylaminophenyl) ester of N-methylbenzylaminothiophosphonic acid

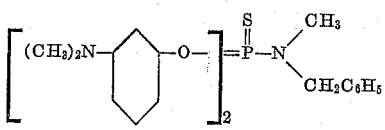

(Heated at 100° C. for 7 hours, no solvent.) The base is a pale yellow oil that distills at about 175° C. at 1 micron pressure, $n_D^{25}$ 1.6140. The dimethiodide crystallizes from absolute alcohol with 2 molecules of water as white plates that melt with gas evolution at 147–9° C.

EXAMPLE XLIII

Di-(m-dimethylaminophenyl) ester of N-n-butylbenzylaminothiophosphonic acid

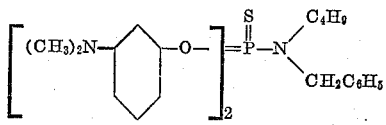

(Heated at 130° C. for 5 hours, no solvent.) The base is a yellow oil that distills at 175° C. at 1–2 microns pressure, $n_D^{25}$ 1.5986. The dimethiodide crystallizes from a mixture of absolute alcohol, acetone and petroleum ether as a white solid that melts at 168–71° C.

EXAMPLE XLIV

Di-(m-dimethylaminophenyl) ester of N-3-dimethylaminopropyl-p-dimethylaminobenzylaminothiophosphonic acid

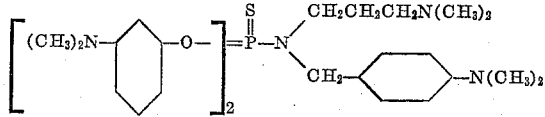

(Heated at 130° C. for 3 hours and at 160° C. for 1 hour, no solvent.) (The N-3-dimethylaminopropyl-p-dimethyl-aminobenzylamine is prepared by condensing 3-dimethylamino-propylamine with p-dimethylaminobenzaldehyde in 95% alcohol and hydrogenating the resulting Schiff's base at room temperature and 1–3 atmospheres hydrogen pressure using a platinum oxide catalyst. It is a colorless liquid, B.P. 138–40° C./0.5 mm., $n_D^{25}$ 1.5347.) The base is a yellow oil that distills at about 180° C. at 1–2 microns pressure, $n_D^{25}$ 1.5940.

EXAMPLE XLV

Di-(m-dimethylaminophenyl) ester of dibenzylaminothiophosphonic acid

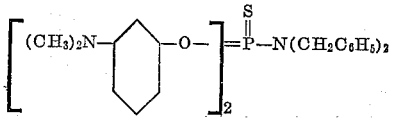

(Heated at 120° C. for 14 hours and at 150° C. for 7 hours, no solvent.) The base is an amber oil that distills at about 200° C. at 2–3 microns pressure, $n_D^{25}$ 1.6230. The dimethiodide crystallizes from absolute alcohol as feathery white needles that melt with gas evolution at 126–8° C.

EXAMPLE XLVI

Di-(m-dimethylaminophenyl) ester of cyclohexylaminothiophosphonic acid

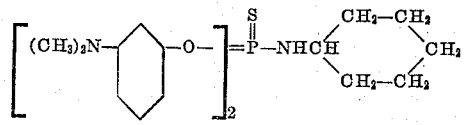

(Heated at 125° C. for ½ hour, no solvent.) The base crystallizes from isopropanol as a white solid, M.P. 59.5–61° C. The dimethiodide crystallizes from isopropanol with 2 molecules of water as a yellow solid that melts with gas evolution at 112–8° C.

EXAMPLE XLVII

Di-(m-dimethylaminophenyl) ester of morpholinothiophosphonic acid

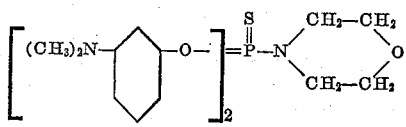

(Heated at 100° C. for ½ hour, no solvent.) The base crystallizes from a mixture of ethyl acetate and petroleum ether as long white needles, M.P. 78.5–9.5° C. The dimethiodide crystallizes from 85% isopropanol with 4 molecules of water as white crystals that melt with gas evolution at 170–2° C.

EXAMPLE XLVIII

Di-(m-dimethylaminophenyl) ester of 2-pyridylaminothiophosphonic acid

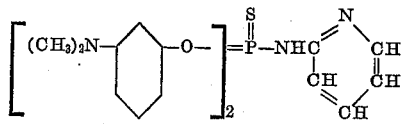

(Heated at 100° C. for 14 hours, no solvent.) The base crystallizes from ethyl acetate as a white solid, M.P. 130–1° C. The dihydrochloride crystallizes from a mixture of isopropanol and ether as a white solid that softens about 70° C. and melts indefinitely about 90° C. The dimethiodide crystallizes from a mixture of methanol and isopropanol with 2 molecules of water as a pale yellow solid that melts with gas evolution at 158–61° C.

EXAMPLE XLIX

Di-(m-dimethylaminophenyl) ester of hydrazinothiophosphonic acid

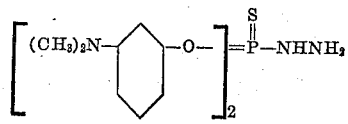

(Heated at 70–75° C. for 7 hours, in benzene.) The base crystallizes from 95% alcohol as white crystals, M.P. 117–8° C. The dimethiodide crystallizes from a mixture of methanol and petroleum ether with 2 molecules of water as white needles that melt with gas evolution at 156–8° C.

EXAMPLE L

*Di-(m-dimethylaminophenyl) ester of phenylhydrazinothiophosphonic acid*

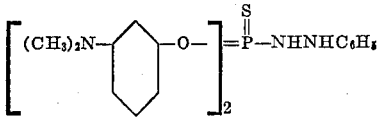

(Heated at 75–8° C. for 5 hours, in benzene.) The base crystallizes from 95% alcohol as fluffy white needles, M.P. 146–7.5° C. The dimethiodide crystallizes from a mixture of methanol and isopropanol with 1 molecule of water as pale tan crystals that melt with gas evolution at 183–4° C.

EXAMPLE LI

*Di-(m-dimethylaminophenyl)β-dimethylaminoethyl thiophosphate*

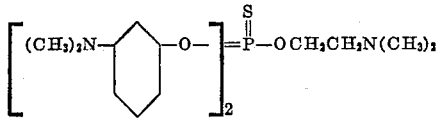

To a solution of 8.91 g. β-dimethylaminoethanol (0.10 mole) and 1.15 g. sodium (0.05 mole) in 100 cc. dry benzene is added a benzene solution of 0.05 mole of di-(m-dimethylaminophenyl) thiophosphoryl chloride, prepared as described in Example XXIX, with stirring at 2–5° C. during 3 hours. The mixture is stirred at 2–5° C. for 3 hours longer, then left at room temperature for 6 days, washed with four 50 cc. portions of water and with 25 cc. saturated sodium chloride solution and is dried over calcium sulfate. Distillation of solvent under reduced pressure to 100° C./12 mm. leaves 16.4 g. yellow oil (77% theory). When purified through its oxalate salt, the base is obtained as a colorless oil, $n_D^{25}$ 1.5851. The mono-oxalate crystallizes from isopropanol as a white solid, M.P. 136–7° C.

EXAMPLE LII

*Di-(m-dimethylaminophenyl) thiophosphate*

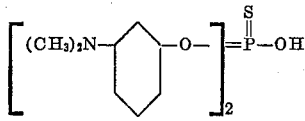

18.27 grams di-(m-dimethylaminophenyl) thiophosphoryl chloride (0.05 mole), prepared as described in Example XXIX, is stirred with 10 cc. 10N sodium hydroxide (0.10 mole) for 3 hours at room temperature and for 15 minutes at 90° C. and cooled. After adding 4.17 cc. 12 N hydrochloric acid (0.05 mole), the mixture is extracted with 450 cc. chloroform. The chloroform extract is dried over calcium sulfate, and solvent is removed by distillation. The residue is crystallized from chloroform, from dilute alcohol and from methanol, giving white crystals, M.P. 170–2° C. The crystals turn blue near their melting point or on standing in air.

EXAMPLE LIII

*Tetra-(m-dimethylaminophenyl) ester of hydrazinobisthiophosphonic acid*

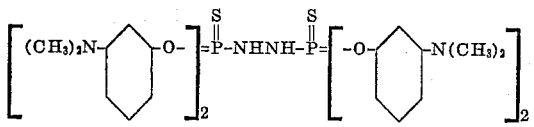

A mixture of 14.77 g. di-(m-dimethylaminophenyl)-thiophosphoryl chloride (0.04 mole), prepared as described in Example XXIX, 14.66 g. di-(m-dimethylaminophenyl) ester of hydrazinothiophosphonic acid (0.04 mole) and 3.16 g. pyridine (0.04 mole) is heated to 150° C. during 1 hour and held at about 150° C. for 2 hours, then cooled. The product is taken up in 50 cc. water plus 300 cc. ether. After adding 25 cc. 2 N sodium hydroxide and shaking, the ether layer is separated and washed with 2 N sodium hydroxide, with water and with saturated brine, stirred with a little Darco, dried over calcium sulfate and filtered. Removal of solvent by distillation leaves 25.65 g. (91% theory) of viscous dark red oil. The tetramethiodide crystallizes from a mixture of propylene glycol and absolute alcohol with 6 molecules of water as white crystals that melt with gas evolution at 144–6° C.

EXAMPLE LIV

*Di-(m-dimethylaminophenyl) p-nitrophenyl phosphate*

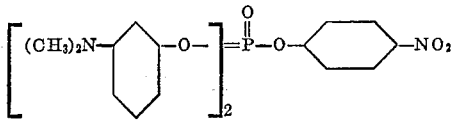

A solution of 13.71 g. m-dimethylaminophenol (0.10 mole) and 10.11 g. triethylamine (0.10 mole) in 125 cc. benzene is added to a solution of 7.67 g. phosphorus oxychloride (0.05 mole) in 75 cc. benzene with stirring at 1–2° C. during 2¼ hours. The mixture is stirred in an ice bath for 5 hours, then left at room temperature overnight and filtered. The filtrate is added to a solution of 6.96 g. p-nitrophenol (0.05 mole) and 5.06 g. triethylamine (0.05 mole) in 200 cc. benzene, and the mixture is stirred at about 78° C. for 6 hours. Most of the benzene is distilled off, 5.06 g. more triethylamine is added, and again stirred at about 78° C. for 4 hours and cooled. The product is stirred with 300 cc. ether and filtered from triethylamine hydrochloride. The filtrate is washed with water, 2 N sodium hydroxide, again with water and with saturated brine, stirred with a little Darco, dried over calcium sulfate (after adding 100 cc. benzene to prevent precipitation of the product), and filtered. Distillation of solvent from the filtrate leaves 17.6 g. viscous orange oil (77% theory) that solidifies on standing. When purified by crystallization from 95% alcohol, orange crystals are obtained, M.P. 121–2° C. The monomethobromide crystallizes from a mixture of methanol and isopropanol as pale yellow crystals, M.P. 153.5–4° C.

EXAMPLE LV

*Di-(m-dimethylaminophenyl) p-nitrophenyl thiophosphate*

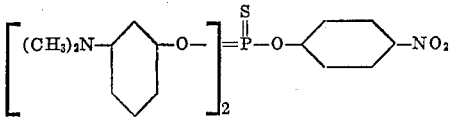

A solution of 6.96 g. p-nitrophenol (0.05 mole) and 5.06 g. triethylamine (0.05 mole) in 10 cc. benzene is slowly added to a solution of 8.47 g. phosphorus thiochloride (0.05 mole) in 75 cc. benzene with stirring at 2–4° C. The mixture is stirred cold for 1 hour and at room temperature for 4 hours and is left at room temperature overnight and filtered. The filtrate is added to a solution of 0.10 mole sodium m-dimethyl-aminophenate in isopropanol and benzene (prepared from m-dimethyl-aminophenol as described in Example XXVIII) with stirring at 2–3° C. during 1½ hours. The mixture is stirred at 2–4° C. for 2 hours and left at room temperature for 3 days, then washed with water, 2 N sodium hydroxide, again with water and with saturated brine, stirred with a little Darco, dried over calcium sulfate, and filtered. Distillation of solvent from the filtrate leaves 20.8 g. (88% theory) of dark orange oil that solidifies on standing. When purified by crystallization from methanol, from isopropanol and from a mixture of ether and methanol, orange crystals are obtained, M.P. 74.5–5.5° C.

This application is a division of my application Serial

No. 297,169 filed July 3, 1952, which is a continuation-in-part of my application Serial No. 75,090, filed February 7, 1949, now abandoned.

I claim:
1. A compound of the group consisting of diaryl esters of acid phosphorus compounds of the general formula

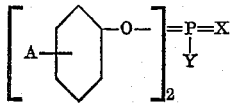

wherein A is selected from the group consisting of lower dialkylamino and lower dialkylamino-loweralkyl, X is selected from the group consisting of sulfur and oxygen and Y is selected from the group consisting of halogen, hydroxyl, alkali metal oxy, lower alkoxy, loweralkylaminoloweralkoxy, monocyclicaryloxy, amino, loweralkylamino, loweralkylaminoloweralkylamino, monocyclicarylamino, monocyclicaralkylamino, loweralkylaminomonocyclicarylamino, cycloalkylamino, loweralkyl, monocyclicaryl, cycloalkyl, morpholino, pyridylamino, hydrazino and phenylhydrazino, and the pharmacologically acceptable acid addition and quaternary salts thereof.

2. A compound as defined in claim 1 wherein A is lower dialkylamino, X is sulfur and Y is halogen.

3. A compound as defined in claim 1 wherein A is lower dialkylamino, X is oxygen and Y is lower dialkylamino.

4. A compound as defined in claim 1 wherein A is lower dialkylamino, X is oxygen and Y is amino.

5. A compound as defined in claim 1 wherein A is lower dialkylamino, X is sulfur and Y is lower dialkylamino.

6. A compound as defined in claim 1 wherein A is lower dialkylamino, X is sulfur and Y is dibenzylamino.

7. Di-(m-dimethylaminophenyl) thiophosphoryl chloride of the formula

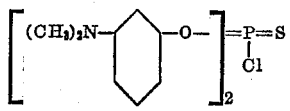

8. Di-(m-dimethylaminophenyl) ester of dimethylaminophosphonic acid of the formula

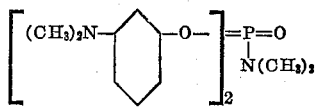

9. Di-(m-dimethylaminophenyl) ester of aminophosphonic acid of the formula

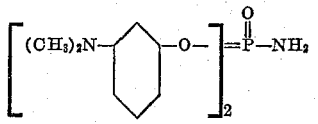

10. Di-(m-dimethylaminophenyl) ester of di-n-butylaminothiophosphonic acid of the formula

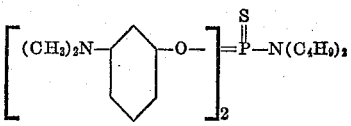

11. Di-(m-dimethylaminophenyl) ester of dibenzylaminothiophosphonic acid of the formula

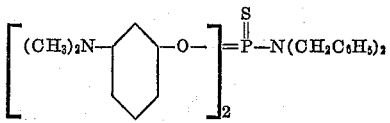

References Cited in the file of this patent
UNITED STATES PATENTS
2,759,961     Fitch _____ Aug. 21, 1956

OTHER REFERENCES
Kosolapoff: "Organo-Phosphorus Compounds," pp. 4–5 (1950).
Chem. & Eng. News 30, 4516–4517 (1952).